United States Patent [19]
Caprioglio

[11] 3,920,950
[45] Nov. 18, 1975

[54] WELDING MACHINE WITH A DISASSEMBLABLE COLUMN
[75] Inventor: Luigi Caprioglio, Turin, Italy
[73] Assignee: Siv Deltix S.p.A., Turin, Italy
[22] Filed: Apr. 30, 1974
[21] Appl. No.: 465,684

[30] Foreign Application Priority Data
May 25, 1973 Italy .................................. 68533/73

[52] U.S. Cl. .................. 219/88; 219/69 R; 219/89; 219/90
[51] Int. Cl.² ...................... B23K 9/28; B23K 11/10
[58] Field of Search ........... 219/69 E, 69 R, 88, 89, 219/90, 124, 125 R, 125 PL

[56] References Cited
UNITED STATES PATENTS

| | | |
|---|---|---|
| 2,376,692 | 5/1945 | Heim .................................... 219/88 |
| 3,222,494 | 12/1965 | O'Connor .......................... 219/69 E |
| 3,521,024 | 7/1970 | Roach .................................... 219/89 |
| 3,594,534 | 7/1971 | Benfield .......................... 219/125 R |
| 3,594,537 | 7/1971 | Morgenegg ........................ 219/69 E |
| 3,784,782 | 1/1974 | Lochen ........................... 219/125 R |

Primary Examiner—J. V. Truhe
Assistant Examiner—N. D. Herkamp
Attorney, Agent, or Firm—Young & Thompson

[57] ABSTRACT

A resistance welding machine for automatically effecting several programmed welding operations, wherein a column, movably supported on a support, carries a unit of operative members which has an elongated shape and can be inserted from the bottom into the column; connection means are provided on the column and the insertable unit for automatically establishing electrical and fluidical connections as a consequence of the mechanical connection of the members.

7 Claims, 7 Drawing Figures

U.S. Patent  Nov. 18, 1975  Sheet 1 of 3  3,920,950
Fig. 1
Fig. 3a
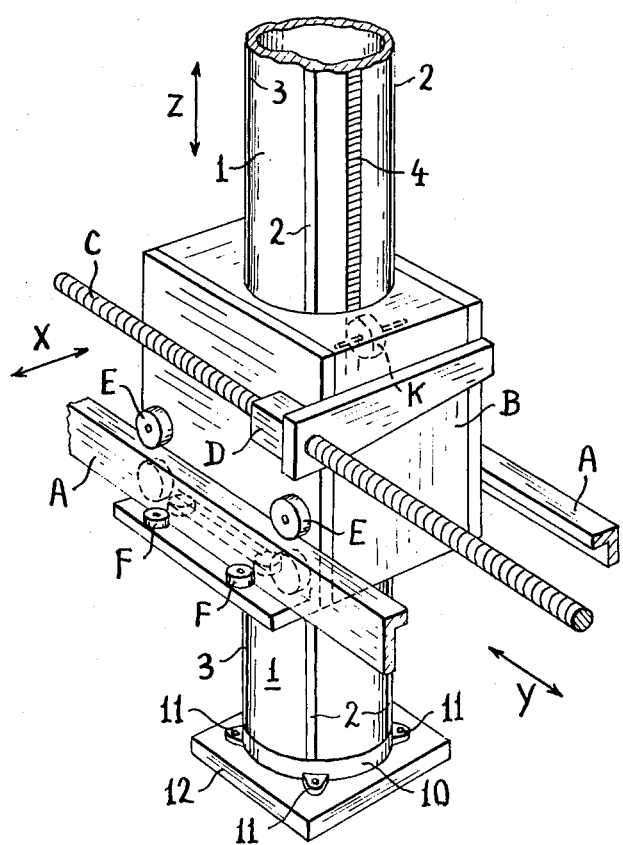
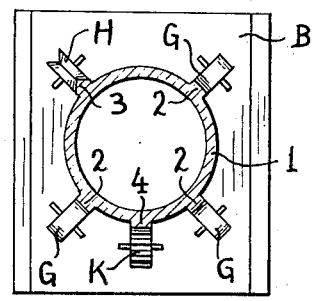
Fig. 2
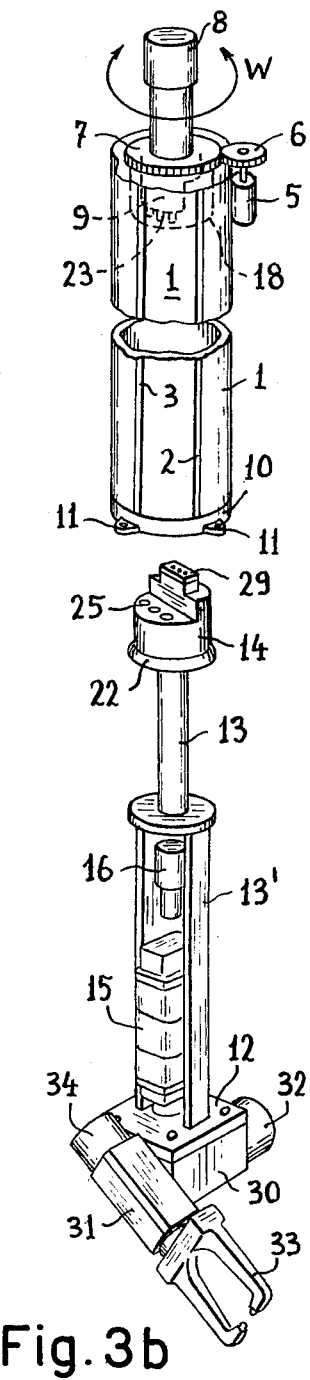
Fig. 3b

WELDING MACHINE WITH A DISASSEMBLABLE COLUMN

BACKGROUND OF THE INVENTION

The present invention relates to a welding machine, particularly a resistance welding machine of the type intended for the accomplishment of a plurality of welding operations under the control of a programmer, in which machine the welding guns are movably supported by a column containing the feeding transformer and other operative members, said column in turn being movably supported on a support.

Generally, the machines of this type are inserted in processing lines, and for this reason it is necessary to reduce to the minimum possible value the times for maintenance and repair required by such machines, during which times the entire processing line must remain inactive. On the other hand, the severe and heavy work which these machines have to accomplish leads relatively often to the necessity of stopping the work for purposes of repair of some members.

BRIEF SUMMARY OF THE INVENTION

The object of this invention is to attain a reduction of the stop times by providing a rapid disassembly and an equally rapid reassembly onto the machine of those members which are most subject to failure and wear, with the possibility of rapidly replacing portions of the machine which include the damaged members with interchangeable reserve portions so as to reduce to a minimum the stop times also when the damages incurred are relatively serious and require operations of long duration for the repair or replacement of the damaged members.

This object is attained according to the present invention by the provision of an arrangement in which the support column which supports the welding guns is made in the form of an elongated shell, all the operative members located inside the column constitute a unit together with the welding gun support, said unit being insertable into and removable from the shell by shifting the unit along the longitudinal direction of the column, and between members fixedly connected to said shell and the unit comprising the operative members there are disposed means of rapid connection which are arranged to automatically establish the required electrical and fluidical connections as a consequence of the mechanical connection.

Moreover, each welding gun preferably is a part of an assembly including means for shifting the welding gun and for its actuation, said assembly being mountable and demountable, with respect to the welding gun support carried by said unit of operative members, between said support and said assembly or each of said assemblies there being provided means of rapid connection which are arranged to automatically establish the required electrical and fluidical connections as a consequence of the mechanical connection.

In this way, upon occurrence of a failure and once the welding machine and the processing line in which the machine is inserted have been stopped, the damaged member may be readily removed, thereby automatically disconnecting the electrical and fluidical connections between said member and the welding machine, then repaired (if such operation does not require a long time) or replaced by a corresponding interchangeable member, then placed in position again, thereby automatically re-establishing also the electrical and fluidical connections, so that the welding machine and the processing line are ready to be operated again after a stopping time reduced to the minimum possible duration.

BRIEF DESCRIPTION OF THE DRAWINGS

These and other features of the welding machine according to the present invention will be more clearly apparent from the following description of illustrative and non-restrictive embodiments, diagrammatically shown in the accompanying drawings, wherein:

FIG. 1 is a view of a portion of the welding gun bearing column of a welding machine, with the carriage which supports said column, FIG. 2 is a cross-sectional view of the shell of the column, with the guiding and driving means for the longitudinal movement, FIGS. 3a and 3b show respectively the column shell and the unit of operative members of the latter, disassembled and longitudinally aligned.

DETAILED DESCRIPTION OF THE PREFERRED EMBODIMENTS

Figure 4:
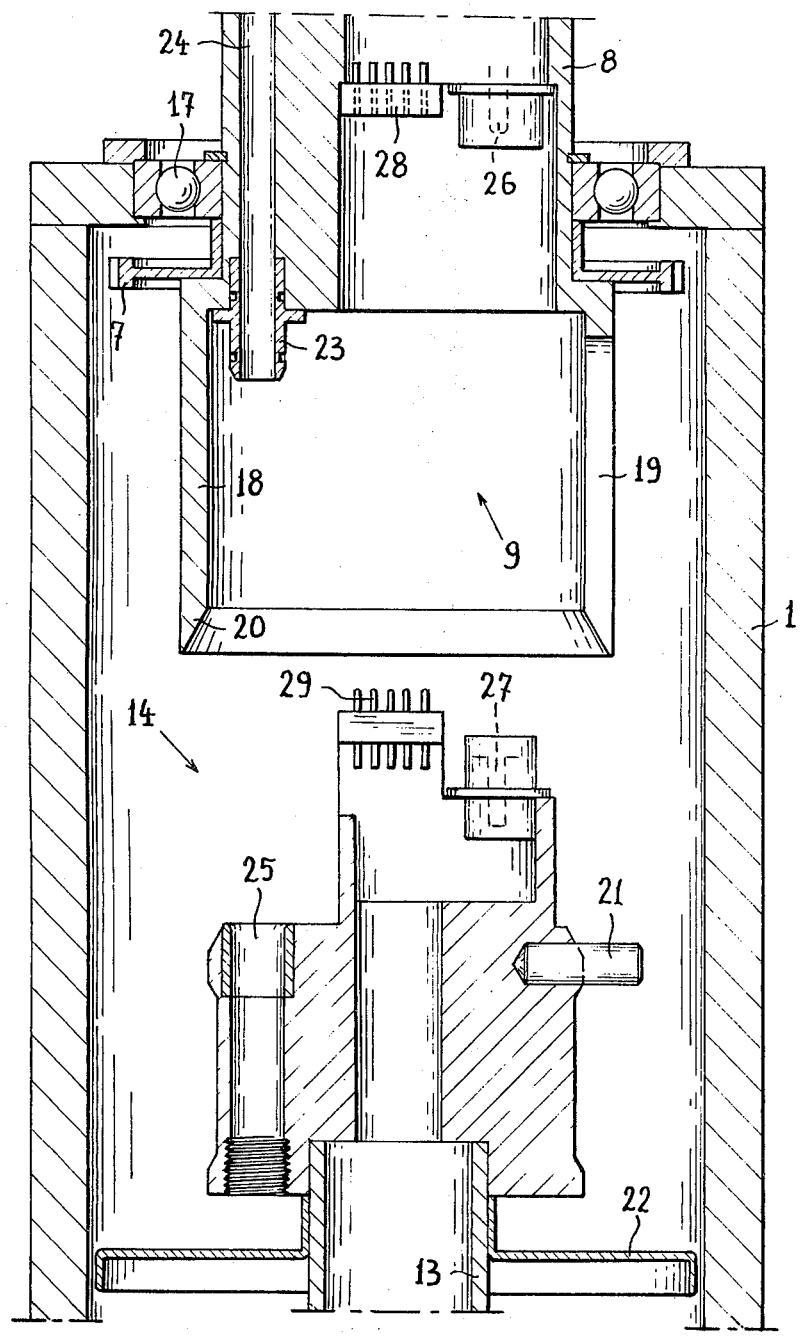
FIG. 4 is an enlarged diametral sectional view taken at the means of electrical and fluidical connection between the members of the column, said members being shown separated but located at short distances from each other.

In the drawings, FIG. 1 diagrammatically shows support means in the form of a pair of horizontal parallel guides A on which is supported and guided, by means of rollers E, F, a carriage B which is movable parallel to the guides A in the direction of the double arrow Y. Motor means, formed in this example by a threaded shaft C cooperating with a nut screw D rigidly connected to the carriage B, are provided for controlling said movement of the carriage. In the complete machine, the support formed by the guides A, and the motor means C, can be supported in any way, and can be fixed or can be in turn a part of a carriage, movable on a fixed frame along a horizontal direction X perpendicular to the direction Y.

The carriage B has mounted therein the column 1 of the welding machine, the longitudinal direction of said column being, in this example, directed vertically. The column 1 is provided with guide tracks 2 which extend longitudinally and cooperate with guide rollers G of the carriage B (FIG. 2), so that the column can move vertically with respect to the carriage. Furthermore, a prismatic guide 3 of the column 1 cooperates with a race wheel H of the carriage B, thus preventing the column from any rotation about its own longitudinal vertical axis. A suitable control means serves to control the vertical movements of the column 1, and said control means may be constituted, as in the example illustrated, by a rack 4 rigidly fastened to the column 1 and cooperating with a sprocket K mounted in the carriage B and connected to a motor means (not shown).

The column 1 mentioned above is made in the form of a hollow shell, practically, in the example shown, in the form of a substantially cylindrical tube. Disposed at the upper end of the column (FIG. 3a) is a motor means 5 which through a drive 6,7 is in a position to impart a motion of rotation in the direction of the curved double arrow W, about the longitudinal axis of the column 1, to a head 8 which is mounted on the column 1 by means of bearing 17 (FIG. 4) in such a way as to be able to rotate, but not to move axially with respect to the column. The head 8 extends into the interior of the shell 1 of the column and terminates therein with a first composite connection means, briefly called in the following a connector, indicated generally by reference numeral 9, which will be described in detail later on.

Mounted at the lower end of column 1 is a rotation bearing 10, preferably of the rolling type, which is provided with outer tabs 11 serving to fasten a plate 12 acting as a support for the welding gun assemblies and being part of the unit of operative members which will now be described.

The unit of the operative members of the column comprises a structure 13 which extends, in this instance vertically upwards, from the support plate 12 and terminates on its upper part with a second composite connection means, briefly called in the following a connector 14, which is arranged to couple with the connector 9 of the head 8. At least a portion 13' of the structure 13 is hollow or of a box-type and in its interior there is mounted the feeding transformer 15 as well as the other required operative members shown diagrammatically as block 16. The transverse dimensions of the structure 13 are smaller than those of the hollow of shell 1, so as to enable it to penetrate freely into the hollow shell 1, and its vertical length corresponds to the distance between the connector 9 and the tabs 11, in such a way that when the support plate 12 is bolted to the tabs 11 of the bearing 10 the connector 14 will be correctly coupled with the connector 9. It follows that it is sufficient to introduce the unit 12–16 from below into the shell 1 and fasten it by bolts, for establishing all the necessary connections in the connectors 9 and 14; conversely, it is sufficient to release mechanically the unit of operative members for withdrawing it downwardly and removing it from the shell 1.

Coming back, with more details, to the connectors 9 and 14, with reference to FIG. 4, the connector 9 of the head 8 and the connector 14 of the unit 13–16 are first of all provided with mechanical coupling means consisting of a ring 18 provided with a longitudinal slit 19 and a lower rake 20, for the connector 9, and a dowel 21, or equivalent member, for the connector 14. Moreover, the unit of the operative members is preferably provided with a centering disc 22 whose dimensions are a little smaller than those of the cavity of the shell 1, so that when the unit is introduced into the shell the connector 14 is substantially centered in the shell, thereby preventing the members from being damaged against the edge of the ring 20. Under these conditions, when one is trying to complete the introduction of the unit 13–16 into the shell 1, the dowel 21 strikes generally against the ring 18 thereby hindering the further introduction until the dowel 21, by rotating the head 8 or the unit 13–16, is caused to register with the split 19 into which it can penetrate, thereby allowing one to complete the coupling. All other members of the connectors are dimensioned such as not to come into mutual contact as long as the dowel 21 abuts against the edge of the ring 18, and thus the connectors are prevented from being accidentally damaged. Furthermore, the members of the connectors come into contact only after the rake portion 20 of the ring 18 has rendered perfect the centering of the connector 14 with respect to the connector 9. In this way, the possibility of exactly coupling all the members of the connectors is ensured.

The connectors, besides being provided with the described means of mechanical coupling, are also provided with fluidical, i.e., hydraulic or pneumatic or partially hydraulic and partially pneumatic coupling means for the pressurized fluid serving to effect the closure of the welding guns, and for the cooling fluid. In the example described, these means of fluidical coupling comprise three pipe fittings 23 projecting from the connector 9, provided with suitable sealing gaskets, and communicating with corresponding pipings 24 of the head 8, and three corresponding pipe fittings 25 in the connector 14, which are arranged to sealingly receive the pipe fittings 23 and communicate with pipes (not shown) of the unit of operative members. The pipe fittings 23 and 25 are disposed such as to couple correctly when the mechanical coupling of the connectors is completed.

Finall, the connectors 9 and 14, besides being provided with the described mechanical and fluidical coupling means, are provided also with electrical coupling means, namely the complementary sockets 26 and 27 for the power circuit which has to feed the transformer 15, and with a certain number of complementary sockets 28 and 29 for the inspection, control and, generally, service circuits. Also these sockets are mutually aligned so as to couple correctly when the mechanical coupling of the connectors is completed. Furthermore, at least in the cases in which the fluids which are fed by the pipe fittings 23, 25 include at least one liquid (usually, water for the cooling and oil for the control of the welding guns), the electrical sockets 26 and 28 of the connector 9 are situated at a level which is considerably higher than the level of the fluidical pipe fittings 23, so that any eventual leaks or sprays coming from the fittings are prevented from wetting and/or fouling the electrical sockets, especially at the moment of the separation of the unit of operative members from the head 8.

The possibility of a rapid separation and a rapid coupling of the unit 13–16 of operative members of the column with respect to the shell 1 of said column is the fundamental characteristic of the invention, because together with the unit 13–16 also the assemblies of welding guns, fixed to the support plate 12, may be detached from the column and consequently it is possible to remove all the parts of the machine which are exposed to wear, more rapid deterioration and more probable failures. However, it is considered advantageous that the assemblies of welding guns may, in turn, be equally quickly separated from and automatically coupled to the support 12, such as to be able to detach or substitute in the machine one or more assemblies of welding guns without having to withdraw from the column the unit of operative members. To this end are provided the arrangements shown in FIGS. 5 and 6.

Each welding gun assembly comprises a support element 30 intended to be demountably fixed to the support plate 12 of the column. A movable support 31, whose movements are controlled by a motor set 32, is pivotally connected to the support element 30 in such a way as to be able to rotate in the direction of the curved double arrow V, i.e., about an axis perpendicular to the axis of the column 1 when the assembly is in its working position. Pivotally connected to the movable support 31, in such a way as to be able to rotate in the direction of the curved double arrow U, i.e., along an axis perpendicular to the axis of rotation of the movable support 31, is a welding gun (of any type) 33, whose movements are controlled and driven by a motor set 34. The combination of the movements in the directions of the arrows U, V, W, X, Y, Z enables the welding gun 33 to act correctly on a piece to be welded, no matter how the latter is oriented in any point in space comprised within certain limits representing the range of action of the welding machine.

Figure 5:
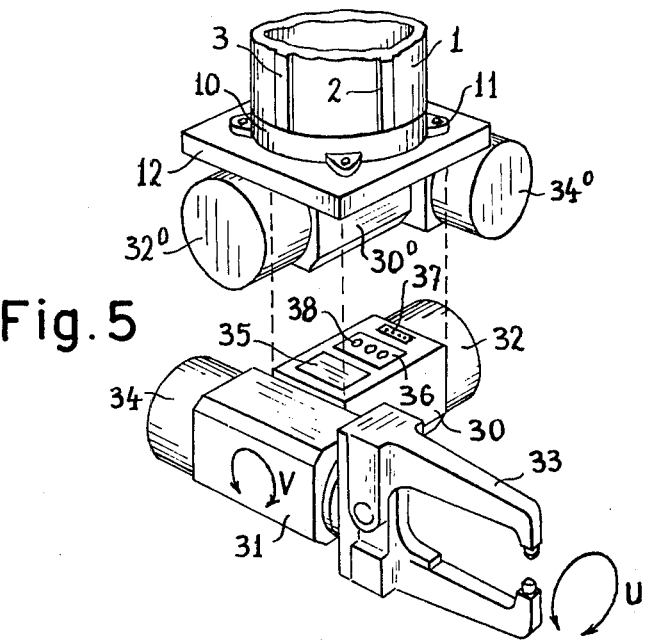
FIG. 5 is a view showing the lower portion of the column and the two welding gun assemblies, one of which is shown assembled and other disassembled.

The assembly of the welding gun 30-34 is represented in FIG. 5 as being adjacent but not fixed to the support plate 12 of the column 1, whereas said plate has fixed thereto a similar welding gun assembly whose visible members are indicated by the same reference numerals as the assembly 30-34, but accompanied by indexes in the form of zeros.

In order to provide the desired easiness and automaticity of the establishment and disconnection of the connections of each assembly with respect to the column, the support element 30 is provided, on its face directed towards the support plate 12, with a composite connection means, comprising two conductive suitably insulated parts 35 and 36 (conveniently connected, in the interior of the assembly 30-34, to the two welding plates of the welding gun 33) to which conductive parts correspond, in a complementary composite connection means of the plate 12, similar conductive and insulated parts on which rest under pressure the parts 35 and 36 of the element 30 when the latter is being fixed, for instance bolted, to the support plate 12. This allows one to establish the necessary electrical power connections. Mounted in the composite connection means of the support element 30 is also a connector 37 which, in its turn, is arranged to be coupled with a complementary connector of the composite connection means of the support plate 12 in order to establish the auxiliary and service electrical connections. Finally, fluid intakes, disposed, for example, on the conductive part 36 (but which could be disposed on any other part of the element 30), are arranged in said connection means, to be coupled with complementary intakes of the support plate 12, in order to establish the fluidical connections which are necessary, on the one hand, for the actuation of the clamping control (hydraulic or pneumatic) of the welding gun 33, and on the other hand for the passage of the cooling fluid for said welding gun.

In this way, the mere mechanical coupling of the support element 30 to the support plate 12 not only brings the welding gun into operative position with respect to the column 1, but also establishes without difficulty all the electrical and fluidical connections required for the operation, thereby permitting an easy and rapid assembly and disassembly of each welding gun onto and from the machine, with the possibility of replacing the welding gun by another similar welding gun in case of failures during operation, or with a different and interchangeable welding gun in case of a passage from one type of work to another.

Figure 6:
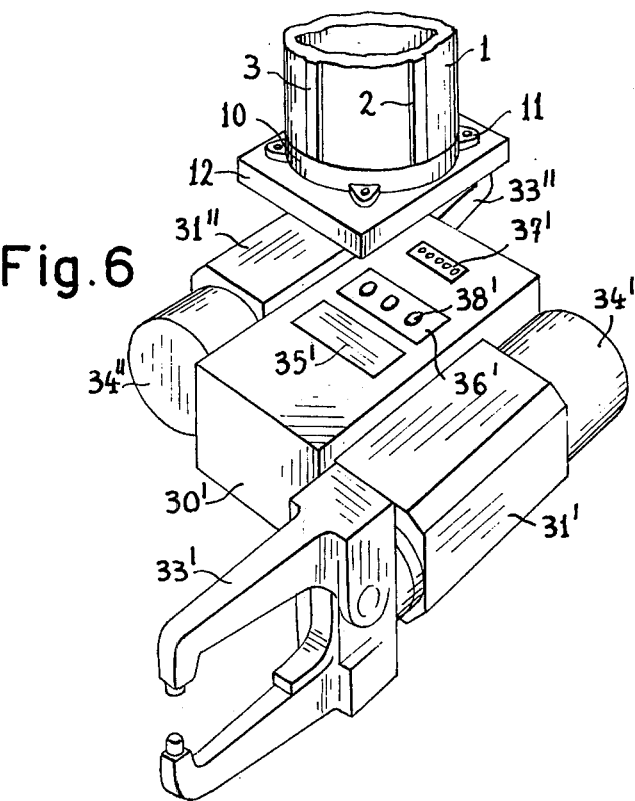
FIG. 6 is a view similar to that of FIG. 5, but showing a different embodiment of the invention.

While according to FIG. 5 each welding gun 33 is provided with its own support element 30 and its own motor means 32, and one, two or more of these assemblies may be mounted on the support plate 12 of the column 1, according to the embodiment shown in FIG. 6 two welding guns 33', 33", mounted with their own motor means 34', 34" on their own movable supports 31', 31", are connected to a single support element 30' provided, as in the preceding embodiment, with conductive parts 35', 36', electrical sockets 37' and fluid intakes 38'. In this case the support plate 12 receives the connection of only one support element 30', by which are mounted and demounted all the welding guns of the column. In this case, the single support element 30' may contain a single motor means (not shown) arranged to control in turn, through suitable couplings, the movements of the movable supports 31', 31" respectively.

The constructional arrangement described and illustrated herein are given only by way of example many modifications of such arrangements can be made in the practical application of the conception of the invention,

Having thus described my invention, what I claim is:

1. A welding machine comprising support means, movably supported on said support means, a column, said column having the form of a hollow shell, at a first end of said hollow shell a head, said head being rotatably mounted on said shell but not axially displaceable, and in said head first connection means, at the second end of said hollow shell a bearing, said bearing being rotatably mounted on said shell but not axially displaceable, and on said bearing first mechanical coupling means, a unit inserted into said hollow shell, at a first end of said unit second connection means that couple with said first connection means of said head, and at the second end of said unit a support plate for welding guns, said support plate having second mechanical coupling means that couple with said first mechanical coupling means of said bearing, said first and second connection means comprising mechanical, electrical and fluidical connection members, and at least one welding gun connected to said support plate, whereby upon insertion of said unit into said shell and coupling of said first and second mechanical coupling means, said first and second connection means are mutually engaged thus automatically establishing all necessary mechanical, electrical and fluidical connections between said column and said unit, as a consequence of the simple mechanical coupling of said column and unit.

2. A welding machine as set forth in claim 1, wherein the mechanical connection members of said first connection means comprise a ring and in said ring a longitudinal split, and the mechanical connection members of said second connection means comprise a laterally protruding pin that penetrates into said split when the angular mutual position of said first and second connection means is correct, and to abut against said ring when said mutual position is incorrect; and wherein said electrical and fluidical connection members of said first and second connection means are mounted for mutual engagement when said pin penetrates into said split, and for avoiding any mutual contact when said pin abuts against said ring.

3. A welding machine as set forth in claim 1, wherein the mechanical connection members of said second connection means comprise a disc for approximately centering said unit within said hollow shell, and the mechanical connection members of said second connection means comprise a ring having a tapered end portion in order to exactly center said connection means upon mutual engagement thereof.

4. A welding machine as set forth in claim 1, wherein the electrical connection members of said first and second connection means are disposed at a level considerably higher than the level of the fluidical connection members of the respective composite connection means, whereby said electrical connection members cannot be wetted nor fouled by leaks or sprays from the fluidical connection members.

5. A welding machine as set forth in claim 1, further comprising at least one assembly comprising a support element mechanically coupled with said support plate of the unit of operative members, and at least one welding gun movably mounted on said support element, and wherein said support plate and support element have complementary connection means comprising mechanical, electrical and fluidical connection members in order to establish all necessary mechanical, electrical and fluidical connections between said unit and said assembly of the welding gun, upon mechanical coupling of said support element and support plate.

6. A welding machine as set forth in claim 1, further comprising one assembly comprising a support element mechanically coupled with said support plate of the unit of operative members, at least two welding guns movably mounted on said support element, and means for controlling the movements of said welding guns relative to said support element.

7. A welding machine as set forth in claim 6, wherein a part of said means for controlling the movements of said welding guns is common to at least two welding guns.

* * * * *